Patented Sept. 29, 1925.

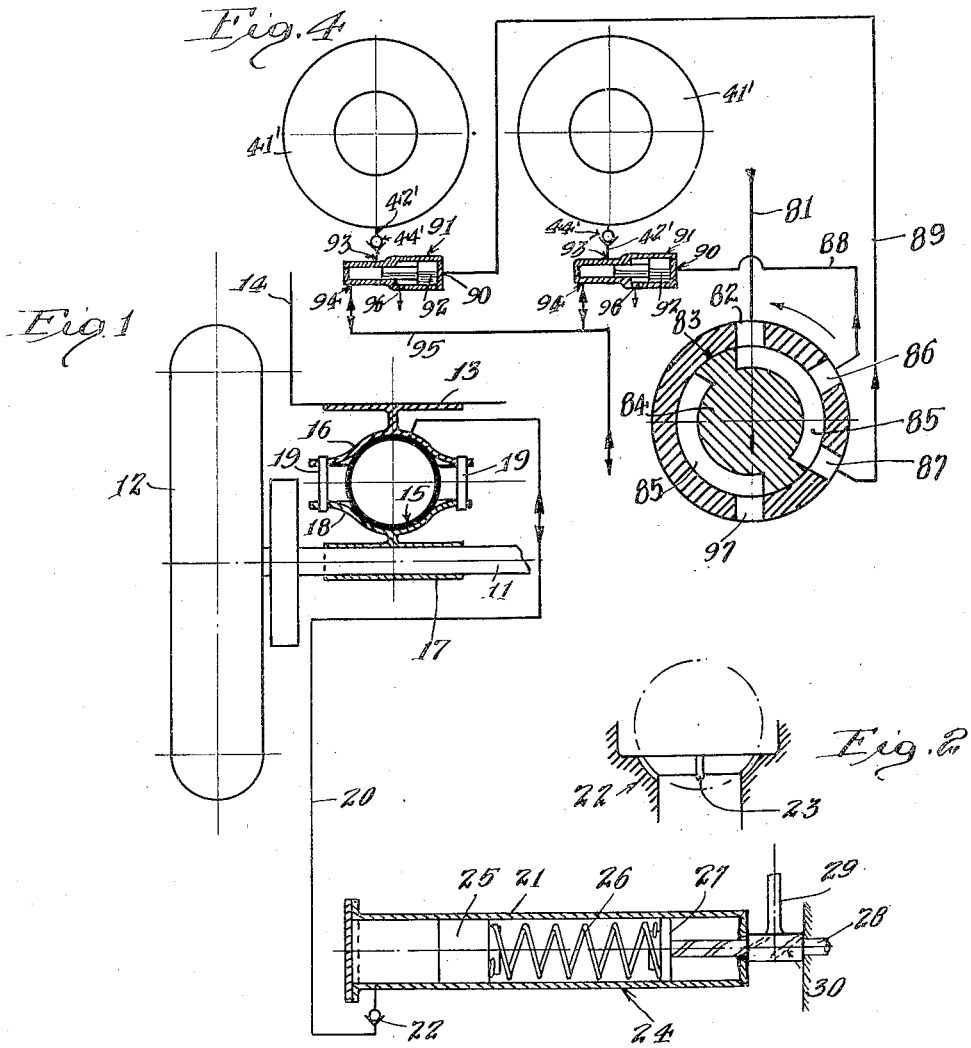

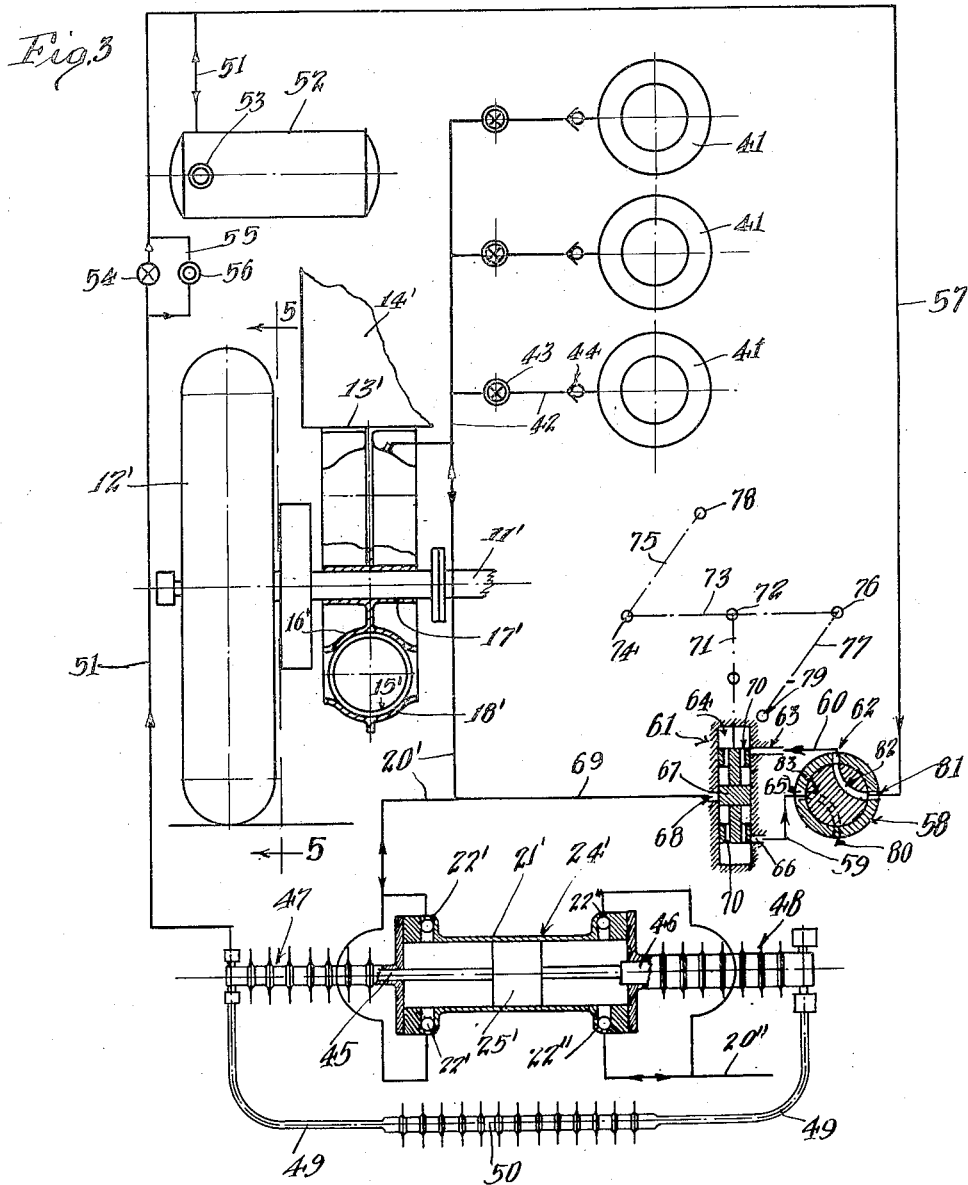

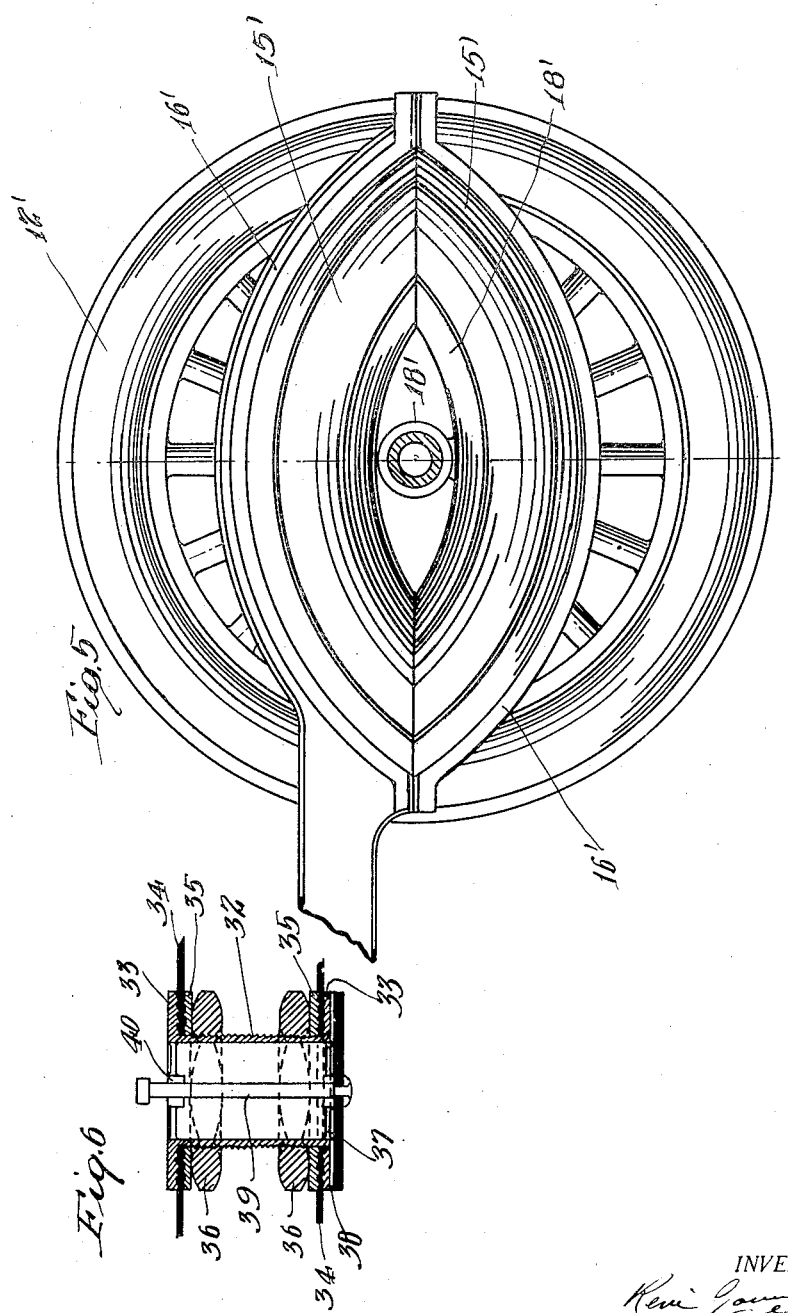

1,555,199

UNITED STATES PATENT OFFICE.

RENÉ GOUIRAND, OF LOS ANGELES, CALIFORNIA, ASSIGNOR OF ONE-HALF TO MARIE JULIA TRACK, OF LOS ANGELES, CALIFORNIA.

VEHICLE WITH PNEUMATIC SUSPENSION.

Application filed June 11, 1923. Serial No. 644,742.

*To all whom it may concern:*

Be it known that I, RENÉ GOUIRAND, a citizen of the United States, residing at Los Angeles, in the county of Los Angeles and State of California, have invented a new and useful Vehicle with Pneumatic Suspension, of which the following is a specification.

This invention has reference to the pneumatic suspension of vehicle bodies, an elastic fluid, such as air or other gas or gases, being employed in cushions placed between the running gear and the frame or body of the vehicle.

It is proposed by this invention to eliminate the present spring suspension between the body and the axle and substitute therefor a system of pneumatic cushions. Though advantageous results are secured by using the pneumatic cushions alone, because the air is more resilient than the usual vehicle springs, the invention further provides for increasing or diminishing the pressure of the elastic fluid within the cushions to meet different loading conditions of the vehicle. For this purpose the elastic fluid may be supplied from a suitable tank. In addition to the foregoing I may, where conditions warrant, augment the volume of elastic fluid employed by connecting the cushions to one or more reservoirs. By increasing or decreasing the volume of the elastic fluid in the system, the "springiness" or softness of the cushioning effect is varied inversely as the pressure and directly as the volume. If desirable the number of reservoirs in action may be controlled from the instrument board or any other point easily accessible to the operator of the vehicle.

The reservoirs mentioned above may or may not be fitted with slow-leak check valves to provide for the comparatively slow return of the elastic fluid that has been expelled from the cushions by a shock imposed thereon. When the slow-leak check valves are not employed, the action of the cushions and reservoirs is comparable with that of a full elliptic spring, and the resiliency may be varied by cutting in or out one or more reservoirs. The employment of slow-leak check valves improves the action, since the elastic fluid is retarded in its return to the cushions, thus making the action of the cushions and reservoirs similar to that of a full elliptic spring with a shock absorber to check the rebound.

In one of its phases the invention also includes the employment of an accumulator or accumulators, one accumulator being used with one or more of the cushions, as desired. The accumulators function to store the built up pressure of the elastic fluid and for this purpose may employ springs or a restrained volume of elastic fluid. In operation, the compressed elastic fluid, after being compressed still further in the cushions by a shock imposed thereon, passes rapidly to the accumulator cylinder through slow-leak check valves, and operates a piston against a resisting increasing pressure produced by a spring or by a restrained volume of elastic fluid. The elastic fluid thus entrapped within the accumulator cylinder is retarded in its return to the cushions by reason of the slow-leak check valves, thus preventing too quick return of the vehicle body and chassis to their normal relative positions. The pressure of the elastic fluid in the cushions lowers immediately after passing of the peak of the pressure imposed by the shock, and the tendency then is for the elastic fluid to return from the accumulator to the cushions. The action thus far described of the accumulator is similar to that of the reservoir. The adjustment of the pressure of the elastic fluid to meet varying load conditions is accomplished, as explained above, by either introducing additional elastic fluid at higher pressure to or expelling elastic fluid from the cushions; or by moving the accumulator piston to different positions within the cylinder. The outward motion of the piston may be resisted by compression of a spring in which power thus becomes stored.

Still another phase of the invention resides in providing for the compressing and storing of atmospheric air by employing the pulsations of elastic fluid from the cushions, resulting from the shocks imposed on the vehicle, which shocks are absorbed through the agency of the pneumatic cushions. It is needless to state all of the uses to which the fluid thus compressed may be put. It may be employed, for example, in brakes of the types operated by an elastic fluid. In order to compress atmospheric air, air compressors may be mounted upon the accumulator cylinder heads. The compressors may be single or double acting and single or multiple stage. The air compressor pistons are actuated by the accumulator pistons, the piston rods thereof being in common. Thus, pulsations of the elastic fluid engendered by shocks on the cushions effect actuation of the accumulator pistons which, operating the compressor pistons, effect compression of air taken from the atmosphere and discharge of the compressed air into a suitable receiver or tank provided with a safety valve. In the drawings a single air compresser is shown of the two stage type with an intercooler between the cylinders.

In some instances the invention may include a valve in the air line between the compressor and the air receiver for securing additional adjustment or regulation of the operating pressure of the accumulator. Closing of such valve causes building up of the compressor discharge pressure and opening the valve lowers the pressure.

As an added safety precaution, a bypass may be introduced in the air line around the other valve just mentioned and said bypass may be provided with a safety valve set at a higher pressure than the safety valve on the air receiver, thus to prevent destructive pressure being built up in the air compressor.

Reference has been made above to the regulation of the elastic fluid pressure by the operator to adjust the system to varying load conditions and in one phase of the invention provision is made for automatic adjustment of the air pressure in accordance with the load imposed on the vehicle. To effect the automatic adjustment, means are provided between the vehicle body or chassis and the axle constructed and connected so that relative movement of the body and axle away from each other operates a valve to permit discharge of elastic fluid from the system, and so that relative motion of the body and axle toward each other will move the valve into position to admit additional elastic fluid from the supply tank to the cushions. The automatic adjustment just described is only effected when a load is being taken on or discharged.

From the foregoing it will be clear that an important object of the invention is to effectually cushion a vehicle body against shocks.

Another important object is to provide for adjustment of the cushioning resistance to suit different load conditions.

A further object is to provide for adjustment of the cushioning resistance to roadway surfaces of different degrees of roughness.

A still further object is to provide for automatic regulation of the cushioning resistance in accordance with different load conditions.

The accompanying drawings illustrate the invention:

Figure 1 is a more or less diagrammatic view, partly in section, of a pneumatic suspension embodying the invention in one of its simpler forms.

Fig. 2 is a sectional view of the valve seat of one of the slow-leak check valves, the valve being indicated in broken lines.

Fig. 3 is a more or less diagrammatic view, partly in section, of a modified form of pneumatic suspension embodying the invention.

Fig. 4 is a diagrammatic fragmental view, partly in section, of a further modification of the invention.

Fig. 5 is an enlarged elevation of the pneumatic cushion and vehicle wheel shown in Figure 3, the axle being in section on the line indicated by 5—5 of said figure.

Fig. 6 is a sectional elevation of the slow-leak check valve employed between the pneumatic cushions shown in Figure 5.

Referring first to Figure 1 of the drawings, the running gear is fragmentarily shown, the vehicle axle being indicated at 11 and one of the vehicle wheels 12 being shown mounted on said axle. The vehicle frame is indicated at 13 and supports the body 14. Between the frame 13 or body 14 and the axle 11 is interposed a pneumatic cushion 15 of any suitable shape and construction. For example, it may be spherical like a hollow ball or may be tubular in construction like a sector of a pneumatic tire. The construction of the cushion, aside from its shape, may be like that of the well known pneumatic tire, thus making it elastic.

In this particular instance, the frame 13 is provided with a cushion holder 16 hemispherical in shape to fit the upper portion of the cushion 15, and on the axle 11 or its housing is mounted a sleeve 17 supporting a cushion holder 18 also of hemispherical shape and fitting the bottom portion of the cushion 15. The cushion holders 16, 18 are suitably connected by members 19 which may be in the form of links or straps and which function to prevent too great separation of the cushion holders. It will be clear that the cushion 15 yieldingly holds the cushion holders separated, or, in other words, yieldingly supports the vehicle body 14. There will preferably be a cushion at each corner of the vehicle, but only one is shown, together with the parts that cooperate therewith since a description of one will suffice for all.

It will be clear from the foregoing that, when the vehicle wheel is subjected to a shock, the elastic fluid, with which the pneumatic cushion is charged, will be more or less compressed, since the walls of the cushion, though somewhat elastic, are sufficiently firm to effect this result. The cushion holders 16, 18 do not confine the side portions of the cushion 15, thus permitting the cushion to spread when it is compressed so that the walls of the cushion will not be buckled, folded or creased.

The above description is of the invention in its simplest form and it will be understood that, as thus far described, the pneumatic cushion will immediately expand, after the shock has passed, thus causing rebound of the vehicle body. Such rebound of the body is objectionable and is overcome by means now to be described:

The cushion 15 is connected by tubing 20 to a receiver 21, there being a slow-leak check valve 22 in the tubing 20 so that, when the vehicle wheel is subjected to a shock, causing compression of the fluid in the cushion, some of said fluid will be forced through the tube 20 into the receiver 21. Naturally, when the shock has passed the cushion 15 recovers, the elastic fluid that has been forced into the receiver 21 tending to flow back into the cushion, but retarded in such flow by the valve 22, thus preventing sudden rebound of the vehicle body. The normal spacing of the cushion holders 16, 18 is gradually attained as the elastic fluid slowly leaks back into the cushion through the valve 22. The valve seat of the valve 22 is illustrated in Figure 2, said seat being grooved or notched at 23 to provide for slow leakage past the valve when the valve is closed.

The receiver 21 may constitute the cylinder of an accumulator, which is indicated in its entirety by the character 24. This particular accumulator is provided with a piston 25 to work in the cylinder. The tubing 20 discharges into the cylinder in front of the piston 25 and a spring 26 in the rear of the piston yieldingly holds said piston against the pressure of the elastic fluid in front of it. The spring 26 may be adjusted longitudinally of the cylinder so as to increase or diminish the pressure of said spring and hence of the elastic fluid and, for this purpose, the end of the spring 26 opposite to that engaging the piston is engaged by the head 27 of an adjusting screw 28 which may be moved endwise by any suitable means as, for example, a lever 29 having a threaded portion 30 engaging the screw.

It will be readily understood that, when the elastic fluid is forced through the tubing 20 into the cylinder 21 by compression of the cushion 15, the piston 25 will be thrust rearwardly against the pressure of the spring 26 and that the pressure of the elastic fluid in the system can be readily increased or diminished by turning the screw 28 so as to move the piston 25 forward or backward to decrease or increase the capacity of the space in the cylinder in front of the piston.

Now referring to the modification shown in Figures 3, 5 and 6, the parts functioning similarly to the parts described above for Figure 1 will be indicated by the same reference characters with the addition of a prime mark and will be briefly described. The axle housing is indicated at 11', the vehicle wheel at 12', the vehicle frame at 13', the vehicle body at 14', the cushions at 15', the outer cushion holder at 16', the sleeve at 17' and the other cushion holder at 18'. The cushions 15' and cushion holders 16', 18' are semicircular in form longitudinally, as clearly shown in Figure 5 of the drawings, the cushions being placed end to end. Said cushions may be connected by one or more passages 32 which may be in the form of a tube as clearly shown in Figure 6. The tube is provided at its opposite ends with clamping jaws 33, the adjacent end walls of the cushions 15', indicated at 34, are clamped between the members 33 and other clamping members 35 which are held toward the clamping members 33 by nuts 36 threaded onto the tube 32. The outer face of one of the clamping members 33 constitutes a valve seat for a valve 37, said valve seat having a notch or groove 38 therein so that, when the valve 37 is closed by reason of a greater fluid pressure in the lower cushion than in the upper, elastic fluid can slowly leak from the lower cushion into the upper cushion until the pressures in said cushions are equalized. The stem 39 of the valve 37 engages a guide 40 mounted in the tube 32. It will be clear from the foregoing that, when shock is encountered by the vehicle wheel 12', said shock will be imposed upon the upper cushion 15' and the elastic fluid therein will be compressed, thus causing some of the elastic fluid to flow through the tube 32 into the lower cushion. As the vehicle body tends to rebound, because of the elasticity of the fluid in the cushion, the pressure in the upper cushion will be decreased, thus allowing the elastic fluid to slowly return into the upper cushion from the lower cushion until the pressures in said cushions are equalized. The valve 37 thus functions substantially the same as the valve 22 in the construction described for Figure 1 and the lower cushion functions as a receiver for fluid from the upper cushion the same as the accumulator cylinder 21 in Fig. 1 and 21' in Fig. 3. The invention, therefore, can be used in this simple form. The cushions 15' being arranged one above and one below the axle, it is clear that rebound of the vehicle body tends to compress the lower cushion 15' and, consequently, the lower cushion functions to aid in absorbing the rebound. In this respect the form of the invention shown in Figure 3 is markedly different from that shown in Figure 1.

To continue with additional features of the form of the invention shown in Figure 3 similar to the form shown in Figure 1, there is provided tubing 20', a receiver 21', a slow-leak check valve 22', an accumulator 24', and a piston 25'. The operation of the construction thus far described for Figure 3 will be readily understood from the above description of the operation of the form of the invention shown in Figure 1.

In some instances where, for example, it is necessary to limit the capacity of the cushions or where the conditions warrant, the volume of elastic fluid in the system may be augmented by the use of one or more receivers or reservoirs 41, there being three shown in this instance. These reservoirs are connected by tubing 42 to the tubing 20' and the tubing 42 is provided with valves 43, whereby any number of the reservoirs may be cut in or out, as desired. The tubing 42 is provided with slow-leak check valves 44 which are constructed and operate the same as the valve 22'. The reservoirs 41 are preferably constructed of an elastic fabric so that they will be expanded to some extent by increased pressure of the elastic fluid caused by the cushion being subjected to a shock. Although the valves 44 are not necessary to obtain the greater resiliency due to the increased volume of fluid, their provision further increases the usefulness of the reservoirs 41 as said valves will cause slow return of the fluid that has been expelled into the reservoirs by compression of the pneumatic cushion.

The accumulator 24' is somewhat differently constructed than that shown in Figure 1 since, when the plunger 25' is moved to the right by fluid admitted to the cylinder through the valves 22', fluid on the other side of the piston, admitted through slow-leak valves 22'' from tubing 20'', yieldingly resists such movement of the piston as it can only escape slowly through the valves 22''. It is to be understood that the tubing 20'' connects with one of the other cushions, not shown, with which the vehicle is equipped. Said other cushions are constructed the same as the cushion 15' and, therefore, need not be described in detail.

The piston 25' is connected on opposite sides to pistons 45, 46 of a compressor. Said compressor may be single or double acting and may be single or multiple stage and, in this instance, is of the two stage type, the two stages being indicated at 47, 48, respectively, and being interconnected by tubing 49 and an intercooler 50. The second stage 47 of the compressor is connected by tubing 51 to a receiver or tank 52, which may be provided with a safety valve indicated at 53. In the tubing 51 is a valve 54 for regulating the pressure against which the accumulator operates. Closing the valve 54 builds up the discharge pressure of the air compressor so as to increase the resistance against movement of the piston 25', and opening said valve permits the discharge pressure of the compressor to lower to a degree where it is equal to the pressure in the air receiver as predetermined by the setting of the safety valve 53, thus decreasing the resistance against movement of the piston.

It may be desirable, as an added safety precaution, to provide a bypass 55 around the valve 54 with a safety valve 56 in said bypass to relieve the pressure when greater than the pressure for which the safety valve 53 is set, thus to prevent building up of a destructive pressure in the air compressor.

To secure automatic regulation or adjustment of fluid pressure in the cushions, reservoirs and cylinder 21', I connect the tubing 51 by tubing 57 to a manually operated valve 58 and I connect said valve 58 by tubing 59, 60 to an automatically operated valve 61. In this instance the valve 58 is of the rotary type, one of its outlet ports 62 being connected by the tubing 60 to an inlet port 63 near one end of the chambers 64 of the valve 61, and one of its inlet ports 65 being connected by the tubing 59 to an outlet port 66 near the other end of the cylinder 64. The valve 58 is provided with an exhaust port 80 open to the atmosphere, and with a port 81 to which the tubing 57 connects. A duct 82 in the valve 58 is adapted at one setting of the valve to register with the ports 62, 81 and a second duct 83 to register with the ports 65, 80.

In the cylinder 64 is a slide valve 67 which controls the inlet ports 63, 66, and also controls another port 68 which is connected by tubing 69 to the tubing 20'. The slide valve 67 is provided with ports 70 so that when the valve 67 is down it opens communication between the tubing 60 and tubing 69 and when the valve is up it opens communication between the tubing 59 and 69. The slide valve 67 is provided with an operating rod 71 which is pivoted at 72 to a link 73 that in turn is pivoted at one end at 74 to a link 75 and at its opposite end is pivoted at 76 to a link 77. The link 75 is pivoted at its other end at 78 to the frame or body of the vehicle, and the link 77 is pivoted at its other end at 79 to the axle or any other part of the running gear. Thus it will be clear that, when a greater load is to be placed in the vehicle, the operator will operate the valve 58 to the position shown in the drawing. As the load is added it naturally compresses the pneumatic cushions and thus causes downward motion of the slide valve 67 so as to admit compressed fluid from the tubing 57 to the tubing 69 whence it passes to the reservoirs 41, cushions 15′ and cylinder 21′. If, on the other hand the load is to be lightened, the valve 58 will be operated as before stated to open communication between the port 65 and an outlet port 80 so that as the load is decreased the rising body will cause upward movement of the slide valve 67 to open communication between the tubing 69 and exhaust port 80. As soon as sufficient fluid has been added or allowed to escape to permit the vehicle body to rise or descend to its normal position, the slide valve 67 will operate to cut off the inlet port 63 or exhaust port 66, and the operator will then turn the valve 58 to a neutral position to close all of its ports.

From the foregoing it will be readily understood that, in the form of the invention illustrated in Figure 3, the shocks to which the vehicle wheels 12′ are subjected will effect compression of the fluid in the pneumatic cushions and some of said fluid will pass into the cylinder 21′ and operate the piston 25′ thus causing compression of air in the air compressor 47, 48 and discharge of said compressed air into the receiver 52 for further use in the system to increase the pressure therein or for use in any other manner desired.

It has been hereinbefore explained, in connection with Figure 3, that the cushions 41 are cut in or out by manipulation of the manual valves 43, but the control may be effected from the instrument board or other convenient point by elastic fluid from the tank 52 or other supply. For this purpose, referring to Fig. 4, the tube 81 from the tank, not shown in this view, connects with a port 82 of a valve chamber 83 containing a rotary valve 84 provided with ducts 85. When the valve is in the position shown in the drawing, one of the ducts 85 communicates with the port 82 and also with other ports 86, 87 in the valve chamber 83. The ducts 86, 87 are connected by tubes 88, 89 to ports 90 at one end of slide valve chambers 91, respectively. In the chamber 91 are differential pressure valves 92, the greater area of said valves being acted on by fluid admitted through the ports 90. The lesser pressure areas of the valves 92 are acted upon by fluid admitted through ports 93 or 94 in the chamber 91. The ports 93 are connected by tubes 42′ to the reservoirs 41′, and the tubes 42′ are provided with slow-leak check valves 44′ constructed and operated the same as the valve 22. The reservoirs 41′, tubes 42′ and check valves 44′ correspond to the same elements in Figure 3 designated by the characters 41, 42, 44. The ports 94 are connected by tubing 95 to the pneumatic cushions, not illustrated in this view, said cushions being the same as those illustrated in Fig. 3.

The valve chambers 91 are provided with exhaust ports 96 open to the atmosphere and the valve chamber 83 is also provided with a port 97 open to the atmosphere. When the operator desires to shut off both reservoirs 41 from the cushions, not shown, he will operate the valve 84 to the position shown in Fig. 4, thus admitting the actuating fluid to the chambers 91 to move the valves 92 to the left to close the ports 93. If he desires to cut one of the reservoirs in he will turn the valve 84 to position to register one of the ducts 85 with the ports 82, 86 and to register the other duct 85 with the ports 87, 97, thus permitting exhaust of the operating fluid from one of the valve chambers 91, whereupon the valve in said chamber will move to the position shown so as to open the port 93 controlled by it. Both of the reservoirs will be cut in by turning the valve 84 to position to register one of the ducts 85 with the ports 86, 87, 97 so as to exhaust the operating fluid from both of the valve chambers 91.

I claim:

1. A vehicle comprising a running gear, a frame, pneumatic cushioning means connecting the running gear and frame, and means under the control of the operator operative to alter the pressure in the cushioning means.

2. A vehicle comprising a running gear, a frame, pneumatic cushioning means connecting the running gear and frame, and means operated by the elastic fluid of the cushioning means when said means are subjected to shocks to compress air.

3. A vehicle comprising a running gear, a frame, pneumatic cushioning means connecting the running gear and frame, and means operating automatically upon alteration in the loading of the vehicle to alter the pressure in the cushioning means and including a manual control whereby said means may be made inoperative.

4. A vehicle comprising a running gear, a frame, cushion holders in pairs, one of the cushion holders of each pair being connected with the running gear and the other cushion holders being connected with the frame, a single flexible pneumatic cushion between each pair of cushion holders, a reservoir connected with each cushion, the several reservoirs being independent of one another, a slow-leak check valve in each of the connections, and means to limit movement of the cushion holders of each pair away from each other.

5. A vehicle comprising a running gear, a frame, pneumatic cushioning means connecting the running gear and frame, a receiver connected with the cushioning means for receiving some of the fluid discharging from the cushioning means when said means are subjected to shock, a piston in the receiver, and means yieldingly holding the piston against the pressure of said fluid.

6. A vehicle comprising a running gear, a frame, pneumatic cushioning means connecting the running gear and frame, a receiver connected with the cushioning means for receiving some of the fluid discharging from the cushioning means when said means are subjected to shock, a piston in the receiver, and pressure means variable at will for yieldingly holding the piston against the pressure of said fluid.

7. A vehicle comprising a running gear, a frame, pneumatic cushioning means connecting the running gear and frame, a receiver connected with the cushioning means for receiving some of the fluid discharging from the cushioning means when said means are subjected to shock, a piston in the receiver, and means to admit compressed fluid to the receiver on the opposite sides of the piston to that with which the cushioning means are connected.

8. A vehicle comprising a running gear, a frame, pneumatic cushioning means connecting the running gear and frame, a receiver connected with the cushioning means for receiving some of the fluid discharging from the cushioning means when said means are subjected to shock, a piston in the receiver, an air compressor operated by the piston, and a tank connected with the air compressor.

9. A vehicle comprising a running gear, a frame, pneumatic cushions mounted between the running gear and frame, a receiver connected at its opposite ends with the respective cushions, slow leak check valves in the connections and a piston in the receiver.

10. A vehicle comprising a running gear, a frame, a pneumatic cushion mounted between the running gear and frame, a receiver connected with the cushion, a piston in the receiver, means yieldingly holding the piston against the pressure of fluid entering the receiver from the cushion, and a slow-leak check valve in the connection between the cushion and receiver.

11. A vehicle comprising a running gear, a frame, pneumatic cushions mounted between the running gear and frame, a receiver connected at its opposite ends with the respective cushions, a piston in the receiver, and slow leak check valves in the connections between the cushions and the receiver.

12. A vehicle comprising a running gear, a frame, pneumatic cushions mounted between the running gear and frame, a receiver connected at its opposite ends with the respective cushions, a piston in the receiver, an air compressor operated by said piston, and a tank connected with the air compressor.

13. A vehicle comprising a running gear, a frame, pneumatic cushions mounted between the running gear and frame, a receiver connected at its opposite ends with the respective cushions, a piston in the receiver, slow leak check valves in the connections between the cushions and the receiver, an air compressor operated by said piston, and a tank connected with the air compressor.

14. A vehicle comprising a running gear, a frame, pneumatic cushions mounted between the running gear and frame, a receiver connected at its opposite ends with the respective cushions, a piston in the receiver, and means independently of the fluid entering the receiver from the cushions to yieldingly limit movement of the piston.

15. A vehicle comprising a running gear, a frame, pneumatic cushions mounted between the running gear and frame, a receiver connected at its opposite ends with the respective cushions, a piston in the receiver, slow leak check valves in the connections between the cushions and receiver, and means independently of the fluid entering the receiver from the cushions to yieldingly limit movement of the piston.

16. A vehicle comprising a running gear, a frame, pneumatic cushions mounted between the running gear and frame, a receiver connected at its opposite ends with the respective cushions, a piston in the receiver, and pressure means independently of the fluid entering the receiver from the cushions to resist the movement of the piston.

17. A vehicle comprising a running gear, a frame, a pneumatic cushion mounted between the running gear and frame, a receiver connected to the cushion, a piston in the receiver, a compressor operated by the piston, a tank, tubing connecting the compressor to the tank, and a valve in said tubing.

18. A vehicle comprising a running gear, a frame, a pneumatic cushion mounted between the running gear and frame, a receiver connected to the cushion, a piston in the receiver, a compressor operated by the piston, a tank, tubing connecting the compressor to the tank, a valve in said tubing, a by-pass around said valve, and a safety valve in the by-pass.

19. A vehicle comprising a running gear, a frame, a pneumatic cushion between the running gear and frame, a compressed fluid tank, valve means connected with the tank and cushion operable to open communication between the tank and cushion by movement of the frame toward the running gear when load on the vehicle is increased, and manually controlled means to open and close the valve.

20. A vehicle comprising a running gear, a frame, a pneumatic cushion between the running gear and frame, valve means connected with the cushion operable to exhaust fluid from the cushion to the atmosphere by movement of the frame away from the running gear when the load on the vehicle is decreased, and manually controlled means to open and close the valve.

21. A vehicle comprising a running gear, a frame, a pneumatic cushion between the running gear and frame, a reservoir connected with the cushion, a fluid operated valve in the connection between the reservoir and cushion to open and close communication therebetween, and a manually operated valve to control the first valve.

22. A vehicle comprising a running gear, a frame, a pneumatic cushion between the running gear and frame, a reservoir connected with the cushion, a slow-leak check valve in the connection between the reservoir and cushion, a fluid operated valve in the connection between the reservoir and cushion to open and close communication therebetween, and a manually operated valve to control the first valve.

23. A vehicle comprising running gear including an axle, a frame, cushion holders on the frame on opposite sides of the axle, cushion holders on the axle on opposite sides thereof, pneumatic cushions between the first and second holders, a tube connecting the cushions, and a slow-leak check valve in said tube operating to permit free flow of fluid from the upper cushion to the lower cushion and to restrict return flow of the fluid from the lower cushion to the upper cushion.

24. A vehicle comprising a running gear, a body, a control member, and means yieldingly supporting the body on the running gear and operating as the load on the body is increased or diminished when the control member is moved to one position to maintain the body at a constant distance from the running gear and operating when the control member is moved to another position to permit the body and running gear to move toward and from each other under shock and recoil, respectively.

25. A vehicle comprising a running gear, a frame, pneumatic cushioning means connecting the running gear and frame, means to alter the pressure on the cushioning means, and means to increase and decrease the volumetric capacity of the cushioning means at will.

26. A vehicle comprising a running gear, a frame, pneumatic cushioning means connecting the running gear and frame, and means to increase and decrease the volumetric capacity of the cushioning means at will.

27. A vehicle comprising a running gear, a frame, an elastic cushion between the running gear and frame, an elastic receiver connected with the elastic cushion, and a slow-leak check valve in the connection.

Signed at Los Angeles, California, this 1st day of June 1923.

RENÉ GOUIRAND.